(12) United States Patent
Lehmann et al.

(10) Patent No.: US 9,140,795 B2
(45) Date of Patent: Sep. 22, 2015

(54) TIME OF FLIGHT SENSOR WITH SUBFRAME COMPRESSION AND METHOD

(71) Applicant: MESA Imaging AG, Zurich (CH)

(72) Inventors: Michael Lehmann, Winterthur (CH); Thierry Oggier, Zurich (CH); Bernhard Buettgen, Adliswil (CH)

(73) Assignee: MESA Imaging AG, Zurich (CH)

( * ) Notice: Subject to any disclaimer, the term of this patent is extended or adjusted under 35 U.S.C. 154(b) by 224 days.

(21) Appl. No.: 13/623,631

(22) Filed: Sep. 20, 2012

(65) Prior Publication Data

US 2013/0070132 A1    Mar. 21, 2013

Related U.S. Application Data

(60) Provisional application No. 61/536,852, filed on Sep. 20, 2011.

(51) Int. Cl.
*H04N 5/335* (2011.01)
*G01S 7/491* (2006.01)
*G01S 7/486* (2006.01)
*G01S 17/89* (2006.01)

(52) U.S. Cl.
CPC .............. *G01S 17/89* (2013.01); *G01S 7/4914* (2013.01); *H04N 5/3355* (2013.01); *G01S 7/4863* (2013.01)

(58) Field of Classification Search
None
See application file for complete search history.

(56) References Cited

U.S. PATENT DOCUMENTS

| | | | |
|---|---|---|---|
| 5,437,281 A * | 8/1995 | Lin et al. | 600/443 |
| 5,856,667 A | 1/1999 | Spirig et al. | |
| 6,825,455 B1 | 11/2004 | Schwarte | |
| 7,462,808 B2 | 12/2008 | Lustenberger et al. | |
| 7,498,621 B2 | 3/2009 | Seitz | |
| 7,574,190 B2 | 8/2009 | Xu et al. | |
| RE42,739 E * | 9/2011 | Fortier | 348/308 |
| 2002/0084430 A1 | 7/2002 | Bamji et al. | |
| 2008/0239466 A1 | 10/2008 | Buettgen | |
| 2008/0291289 A1 * | 11/2008 | Kurane | 348/222.1 |
| 2009/0021617 A1 * | 1/2009 | Oggier et al. | 348/294 |
| 2010/0276572 A1 * | 11/2010 | Iwabuchi et al. | 250/208.1 |

(Continued)

FOREIGN PATENT DOCUMENTS

DE    10 2004 016 626 A1    10/2005
EP                  1513202 A1    3/2005

(Continued)

OTHER PUBLICATIONS

International Preliminary Report on Patentability, The International Bureau of WIPO, PCT/IB2012/001852, dated Mar. 25, 2014.

(Continued)

*Primary Examiner* — Timothy J Henn
*Assistant Examiner* — Quan Pham
(74) *Attorney, Agent, or Firm* — Fish & Richardson P.C.

(57) ABSTRACT

A demodulation image sensor, such as used in time of flight (TOF) cameras, extracts all storage- and post-processing-related steps from the pixels to another array of storage and processing elements (proxels) on the chip. The pixel array has the task of photo-detection, first processing and intermediate storage to create subframes, while the array of storage and processing elements provides accumulation into frames. Particularly, sampled values of several subframes are summed in a compressed manner. Possible compression is to use exponential function.

12 Claims, 11 Drawing Sheets

(56) References Cited

U.S. PATENT DOCUMENTS

| | | | |
|---|---|---|---|
| 2010/0283878 A1* | 11/2010 | Lin | 348/294 |
| 2011/0164132 A1* | 7/2011 | Buettgen et al. | 348/135 |
| 2011/0292370 A1* | 12/2011 | Hills et al. | 356/5.01 |
| 2013/0140433 A1* | 6/2013 | Oggier et al. | 250/208.1 |

FOREIGN PATENT DOCUMENTS

| | | |
|---|---|---|
| EP | 2 018 041 A2 | 1/2009 |
| WO | 2011085079 A1 | 7/2011 |

OTHER PUBLICATIONS

Buettgen, B. "Extending Time-of-Flight Optical 3D-Imaging to Extreme Operating Conditions," A dissertation submitted to the Faculty of Science of the University of Neuchatel for the degree of Doctor of Sciences, 2006, 209 pages.

Buettgen, B. et al., "Demodulation Pixel Based on Static Drift Fields," IEEE Transactions on Electron Devices, vol. 53, No. 11, Nov. 2006, 2741-2747.

Durini, D. et al., "Lateral drift-field photodiode for low noise, high-speed, large photoactive-area CMOS imaging applications," Nuclear Instruments and Methods in Physics Research Section A, vol. 624, No. 2, 2010, pp. 470-475.

Guezzi-Messaoud, F. et al., "A Novel 3D Architecture for High Dynamic Range Image Sensor and on-Chip Data Compression," SPIE-IS&T, vol. 7875, 2011, pp. 78750T-1-78750T-4.

Oggier, T. et al., "An all-solid-state optical range camera for 3D real-time imaging with sub-centimeter depth resolution (SwissRangerTM)," SPIE, vol. 5249, 2004, pp. 534-545.

Oggier, T. et al., "Novel Pixel Architecture with Inherent Background Suppression for 3D Time-of-Flight Imaging," SPIE, vol. 5665, Jan. 2005, pp. 1-8.

Rhee, J. et al., "Analysis and Design of a Robust Floating Point CMOS Image Sensor," IEEE Sensors Journal, vol. 9, No. 5., May 2009, pp. 578-585.

Tubert, C. et al., "High Speed Dual Port Pinned-photodiode for Time-of-Flight Imaging," International Image Sensor Workshop, 2009, Bergen, Norway, 3 pages.

International Search Report and Written Opinion of the International Searching Authority dated Mar. 4, 2013, from counterpart International Application No. PCT/IB2012/001852, filed Sep. 20, 2012.

* cited by examiner

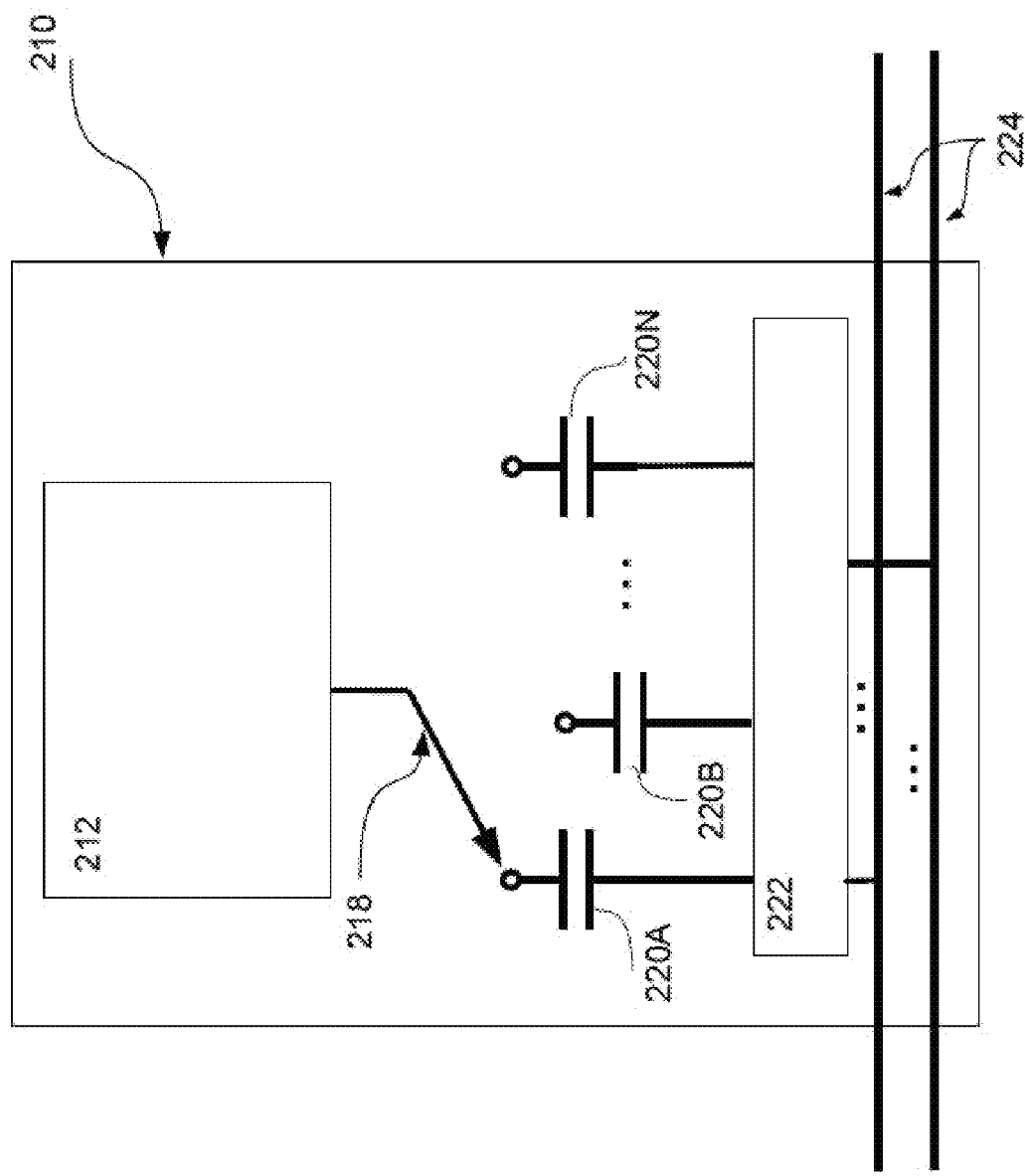

TIME OF FLIGHT SENSOR WITH SUBFRAME COMPRESSION AND METHOD

RELATED APPLICATIONS

This application claims the benefit under 35 U.S.C. 119(e) of U.S. Provisional Application No. 61/536,852, filed on Sep. 20, 2011, which is incorporated herein by reference in its entirety.

BACKGROUND OF THE INVENTION

Electronic imaging sensors usually have an array of m×n photo-sensitive pixels, with m>=1 rows and n>=1 columns. Each pixel of the array can individually be addressed by dedicated readout circuitry for column-wise and row-wise selection. Optionally a block for signal post-processing is integrated on the sensor.

The pixels typically have four basic functions: photo detection, signal processing, information storage, and analog or digital conversion. Each of these functions consumes a certain area on the chip.

A special group of smart pixels, called demodulation pixels, is well-known for the purpose of three dimensional (3D) time of flight (TOF) imaging. Other applications of such demodulation pixels include fluorescence life-time imaging (FLIM). The pixels of these demodulation imaging sensors typically demodulate the incoming light signal by means of synchronous sampling or correlating the signal. Hence, the signal processing function is substituted more specifically by a sampler or a correlator. The output of the sampling or correlation process is a number n of different charge packets or samples (A0, A1, A3 ... An−1) for each pixel. Thus, n storage sites are used for the information storage. The typical pixel output in the analog domain is accomplished by standard source follower amplification. However, analog to digital converters could also be integrated at the pixel-level.

The image quality of demodulation sensors is defined by the per-pixel measurement uncertainty. Similar to standard 2D imaging sensors, a larger number of signal carriers improves the signal-to-noise ratio and thus the image quality. For 3D imaging sensors, more signal carriers mean lower distance uncertainty. In general, the distance measurement standard deviation a shows an inverse proportionality either to the signal A or to the square root of the signal, depending whether the photon shot noise is dominant or not.

$$\sigma \propto \frac{1}{\sqrt{A}}$$

if photon shot noise is dominant $$\sigma \propto \frac{1}{A}$$

it other noise sources are dominant

A common problem for all demodulation pixels used in demodulation sensors, such as for TOF imaging or FLIM, or otherwise, arises when trying to shrink the pixel size to realize arrays of higher pixel counts. Since the storage nodes require a certain area in the pixel in order to maintain adequate full well capacity and thus image quality, the pixel's fill factor suffers from the shrinking process associated with moving to these larger arrays. Thus, there is a trade-off between the storage area needed for obtaining a certain image quality and the pixel's photo-sensitivity expressed by the fill-factor parameter. In the case of a minimum achievable image quality, the minimum size of the pixel is given by the minimum size of the total storage area.

In 3D imaging, typically a few hundreds of thousands up to several million charge carriers, i.e. typically electrons, need to be stored in order to achieve centimeter down to millimeter resolution. This performance requirement, in turn, means that the storage nodes typically cover areas of some hundreds of square micrometers in the pixel. Consequently, pixel pitches of 10 micrometers or less become almost impossible without compromises in terms of distance resolution and accuracy.

The aforementioned trade-off problem becomes even more critical if additional post-processing logic is to be integrated on a per-pixel basis. Such post-processing could include for example analog-to-digital conversion, logic for a common signal subtraction, integrators, and differentiators, to list a few examples.

Another challenge of the demodulation pixels is the number of samples required to unambiguously derive the characteristics of the impinging electromagnetic wave. Using a sine-modulated carrier signal, the characteristics of the wave are its amplitude A, the offset B and the phase P. Hence, in this case, at least three samples need to be acquired per period. However, for design and stability reasons, most common systems use four samples. Implementing a pixel capable of capturing and storing n=4 samples requires in general the four-fold duplication of electronics per pixel such as storage and readout electronics. The result is the further increase in the electronics per pixel and a further reduction in fill factor.

In order to avoid this loss in sensitivity, most common approaches use so-called 2-tap pixels, which are demodulation pixels able to sample and store two samples within the same period. Such type of pixel architectures are ideal in terms of sensitivity, since all the photo-electrons are converted into a signal and no light is wasted, but on the other hand, it requires at least two consequent measurements to get the four samples. Due to sampling mismatches and other non-idealities, even four images might be required to cancel or at least to reduce pixel mismatches. Such an approach has been presented by Lustenberger, Oggier, Becker, and Lamesch, in U.S. Pat. No. 7,462,808, entitled Method and device for redundant distance measurement and mismatch cancellation in phase measurement systems, which is incorporated herein by this reference in its entirety. Having now several images taken and combined to deduce one depth image, motion in the scene or a moving camera renders artifacts in the measured depth map. The more those different samples are separated in time, the worse the motion artifacts are.

A new architecture has been disclosed by Oggier and Buettgen in U.S. Pat. Pub. No. 2011/0164132A1. The architecture enables the shrinking of the pixel size without significantly reducing the pixel's fill factor and without compromising the image quality due to smaller storage nodes. The solution even provides the possibility for almost arbitrary integration of any additional post-processing circuitry for each pixel's signals individually. Furthermore, it can reduce the motion artifacts of time-of-flight cameras to a minimum. Specifically, this demodulation sensor comprises a pixel array comprising pixels that each produce at least two samples and a storage or proxel array comprising processing and/or storage elements, each of the storage elements receiving the at least two samples from a corresponding one of the pixels. The pixels comprise photosensitive regions in which incoming light generates charge carriers and demodulators/correlators that transfer the charge carriers among multiple storage sites in the pixels. A transfer system is provided that transfers the samples generated by the pixels to the corresponding storage elements of the proxel array. In example embodiments, the transfer system analog to digitally converts the samples received by the storage elements. The proxel array then accumulates multiple subframes in time until the entire frame is readout from the proxel array.

SUMMARY OF THE INVENTION

The present invention concerns an approach for increasing the dynamic range of TOF sensors. It is preferably applied to sensors that utilize separate pixel and proxel arrays.

In general, according to another aspect, the invention features a demodulation sensor, which comprises a pixel array comprising pixels that each produces at least two samples for subframes and a storage array comprising storage elements. Each of the storage elements receives the at least two samples from a corresponding one of the pixels and accumulates the subframes into full frames. A subframe compression unit is provided that compresses the subframes.

Preferably, the subframe compression unit performs exponential compression.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 3 is a block diagram showing the functions of a general demodulation pixel;

DETAILED DESCRIPTION OF THE PREFERRED EMBODIMENTS

One of the biggest challenges of TOF cameras is the dynamic range that the sensor needs to cover in order to measure differently reflective objects in the whole scene with a certain accuracy. The definition of dynamic range of a 3D TOF sensor is according to:

$$DR_{se} = FW/N_{el}(\sigma_R)$$

where FW is the full well number of electrons and $N_{el}(\sigma_R)$ is the number of electrons necessary to achieve a certain noise of the distance measurement $\sigma_R$.

The dynamic range of the scene, however, is determined by the objects and distances that need to be measured. Assuming the targets show Lambert reflection properties, the targets can be characterized by their distance to the camera and their reflectivity, whereas the backscattered modulated light from the target drops with the squared distance. As an example, an application requires to measure targets at a distance from 30 cm to 300 cm, with a reflectivity of 10% to 100%, the dynamic range of the scene to be covered results in:

$$DR_{scene} = \frac{300^2}{30^2} \cdot \frac{100}{10} = 1'000$$

In this dynamic range estimation, possible background light is neglected. In more general way, the dynamic range of the scene to be covered by the sensor's dynamic range is expressed in B. Büttgen, "Extending Time-of-Flight Optical 3D-Imaging to Extreme Operating Conditions", Ph.D. thesis, University of Neuchatel, 2006 as:

$$DR_{scene} = (R_{max}^2/R_{min}^2) \times (\rho_{max}/\rho_{min})$$

where $R_{min}$, $R_{max}$ are minimum and maximum distances in the scene, and $\rho_{min}$, $\rho_{max}$ are the minimum and maximum reflectivities of the objects, respectively.

The first challenge here is that the pixel itself can handle the required dynamic range. A first approach has been described in T. Oggier, R. Kaufmann, M. Lehmann, B. Büttgen, S. Neukom, M. Richter, M. Schweizer, P. Metzler, F. Lustenberger, and N. Blanc, "Novel pixel architecture with inherent background suppression for 3D time-of-flight imaging", Proc. Of the SPIE, Vol. 5665, pp. 1-8, January 2005. Other possibilities are presented in X. Zhanping, H. Kraft, T. Möller, J. Frey, Signalverarbeitungselektronik, DE 10 2004 016 626A1.

However, the aforementioned dynamic range enhancements of the pixel mainly help to cancel the common offset of the samples, which primarily means they show better performance in background light suppression but do not significantly help to reduce the dynamic range issue of the modulated light.

When sensors using proxel arrays are used, the dynamic range of the modulated light can be improved applying subframe accumulation with optionally different exposure times. However, the required dynamic range of the analogue to digital (AD) represents another bottleneck in terms of dynamic range. This bottleneck is described below after a review of a sensor with a proxel array.

Figure 1:
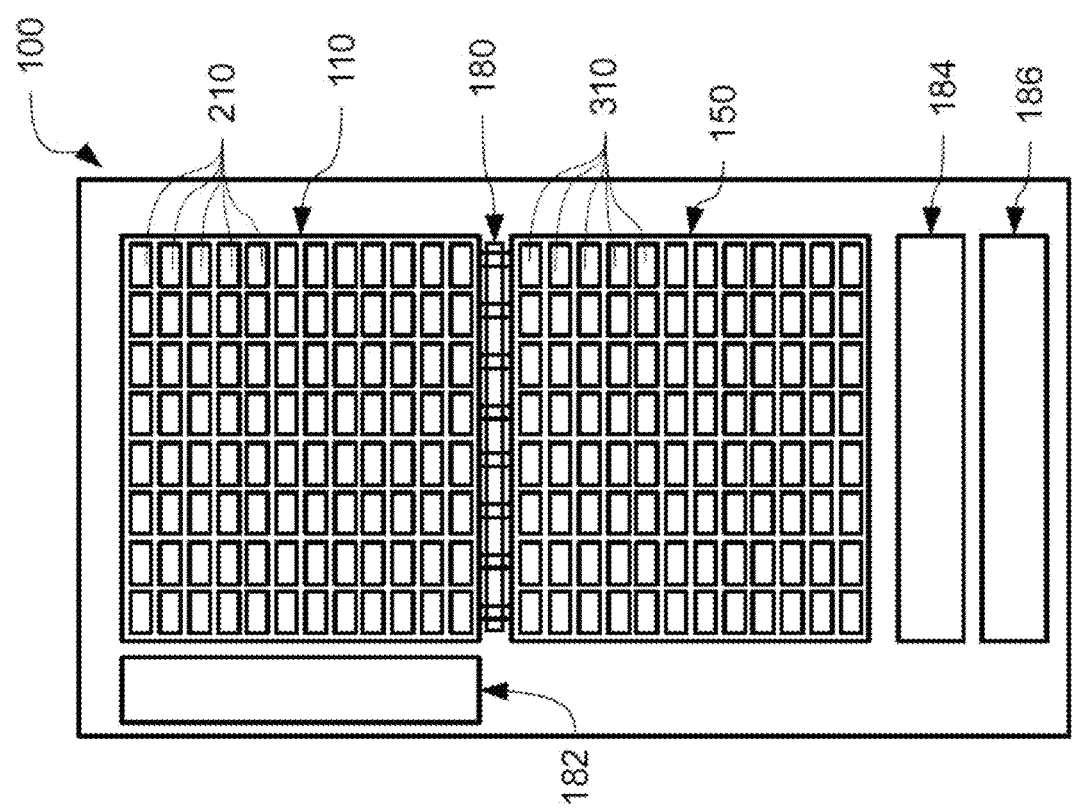
FIG. 1 is a schematic diagram showing an electronic imaging sensor including a photo-sensitive pixel array and a separate storage or proxel array, which provides final frame storage and readout capability for each pixel.

FIG. 1 shows a demodulation sensor 100 that uses a proxel array.

The illustrated architecture extracts elements, which are typically integrated inside the pixel but not necessarily required for the photo detection, out of the pixel into physically separated elements that are basically storage and sometimes processing elements, termed storage elements or proxels. As a consequence, the sensor includes a pixel array 110 of x×y pixels and a storage or proxel array 150 of x×y of storage elements or proxels 310 that are used for further processing, storage of the information and readout. Usually x and y are greater than 100, and preferably greater than 200. In some examples x, y are greater than 1000. The two arrays are physically separated from each other in preferably discrete arrays that do not physically overlap with each other on the chip.

Subframe accumulation is handled in this proxel array 150. Thus, the sensor 100 includes the pixel array 110 and the proxel array 150, where each proxel 310 is linked to and associated with preferably one particular pixel 210.

It is worth mentioning that the proxel array 150 does not have to be one contiguous array. In examples the proxel array 150 is split into two, three, or four matrices that surround the pixel array 110.

The data transfer of the pixel 210 to the proxel 310 is controlled by the pixel readout decoder 182 and transferred through the transfer or connection system 180. The pixel readout decoder 182 selects the pixel 210 and establishes the connection 180 to the corresponding proxel 310. Preferably, the readout of the pixel field 110 is done row-wise. Hence, the readout decoder selects at least one row of the pixel field 110 which is then connected to the corresponding rows of proxels 310 in the proxel field 150. In that case, the connection lines of the transfer or connection system 180 are shared by all pixels in a column. In order to further speed up the pixel readout, multiple rows could be selected and transferred as well.

Additionally included in the sensor 100 is the proxel readout decoder 186 for controlling the readout of the proxels. An optional signal post processing block 184 is provided for calculating phase/depth information based on the n acquired samples, for example.

The transfer or connection system 180 between the pixel array 110 and the proxel array 150 includes analog to digital converters. The information arriving and processed at the proxel array is therefore digital.

Figure 2A:
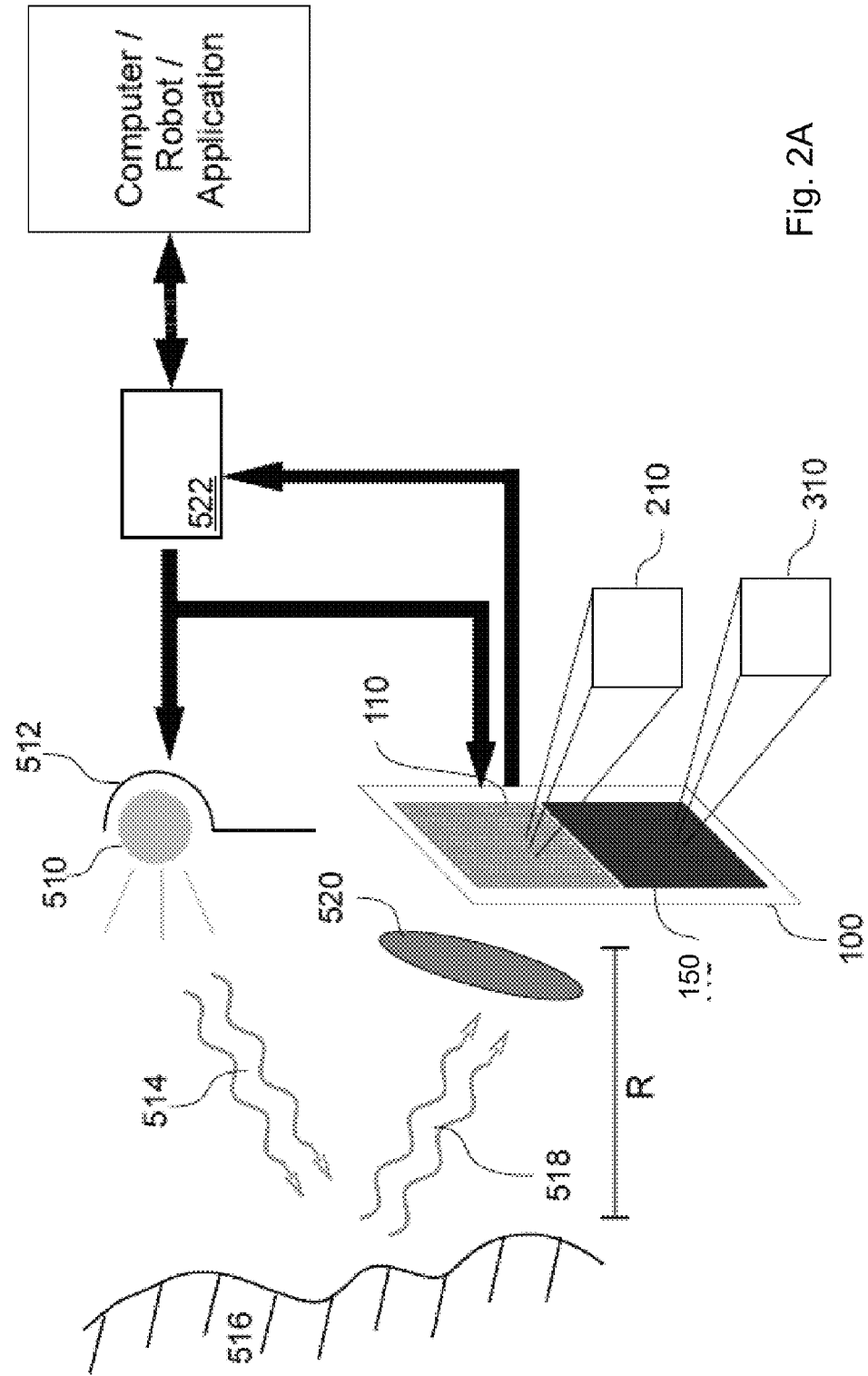
FIG. 2A illustrates the basic principle of time-of-flight cameras.

FIG. 2A shows the typical application of a 3D TOF camera that uses the inventive sensor 100.

In more detail, a light source or emitter 510 with a possible reflector or projection optics 512 produces light 514 that is intensity-modulated in time and directed at the 3-D scene 516 at range R from the camera. The returning light 518 from the scene 516 is collected by the objective lens system 520 and possibly bandpass filtered so that only light at the wavelength emitted by the light emitter 510 is transmitted. An image is formed on the pixel array 110 of the TOF sensor 100. A control unit 522 coordinates the modulation of the light emitter 510 with the sampling of the TOF detector chip 100. This results in synchronous demodulation. That is, the samples that are generated in each of the pixels 210 of the pixel array 110 are stored in the storage buckets or sites in the pixels and/or proxels 310 in the storage or proxel array 150 synchronously with the modulation of a light emitter 510. The kind of modulation signal is not restricted to sine but for simplicity, sine wave modulation only is used for illustration.

The information or samples are transferred to the storage or proxel array 150 and then readout by the control unit 522, which then reconstructs the 3-D image representation using the samples generated by the chip 100 such that a range r to the scene is produced for each of the pixels of the chip 100.

In the case of sine wave modulation, using the n=4 samples A0, A1, A2, A3 generated by each pixel/proxel, the three decisive modulation parameters amplitude A, offset B and phase shift P of the modulation signal are extracted by the equations:

$$A = \text{sqrt}[(A3-A1)^2+(A2-A1)^2]/2$$

$$B = [A0+A1+A2+A3]/4$$

$$P = \arctan[(A3-A1)/(A0-A2)]$$

With each pixel 210 of the sensor 100 being capable of demodulating the optical signal at the same time, the controller unit 522 is able to deliver 3D images in real-time, i.e., frame rates of up to 30 Hertz (Hz), or even more, are possible. Continuous sine modulation delivers the phase delay (P) between the emitted signal and the received signal, which corresponds directly to the distance R:

$$R = (P*c)/(4*pi*fmod),$$

where fmod is the modulation frequency of the optical signal 514. Typical state-of-the-art modulation frequencies range from a few MHz up to a few hundreds of MHz or even GHz.

Figure 2B:
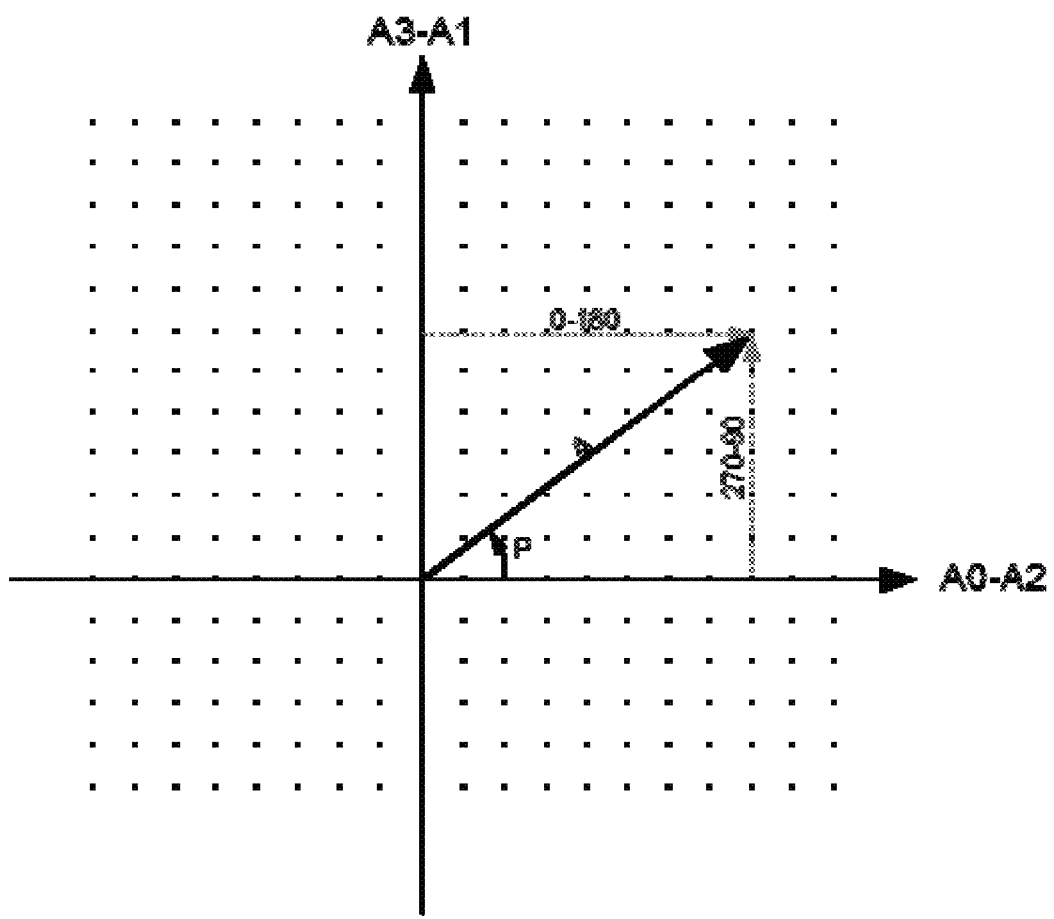
FIG. 2B shows a phase diagram for linear quantization.

FIG. 2B shows the phase diagram with linear quantization.

The following example shows how the AD conversion can limit dynamic range.

It is assumed that the minimum depth resolution that needs to be achieved by the TOF camera is 3 cm. Background light is neglected.

A minimum number of electrons can be deduced for achieving this depth resolution by exploiting the following formula:

$$\sigma = \frac{L0}{2\pi \cdot \sqrt{2}} \cdot \frac{\sqrt{B+N\_pseudo}}{A}$$

with:

L0=non-ambiguity range (e.g. 30 MHz gives about 500 cm)B=mean of the sampled values in electrons,
N_pseudo=electron-noise equivalent of other noise sources than shot noise, and
A=Amplitude in electrons derived from the samplings.

This minimum number of electrons strongly depends on the system parameters such as non-ambiguity range and demodulation contrast and mainly determines the required dynamic range by the pixel. Independent of this number of electrons, the digitization needs to resolve the minimum expected phase change as well.

Figure 2C:
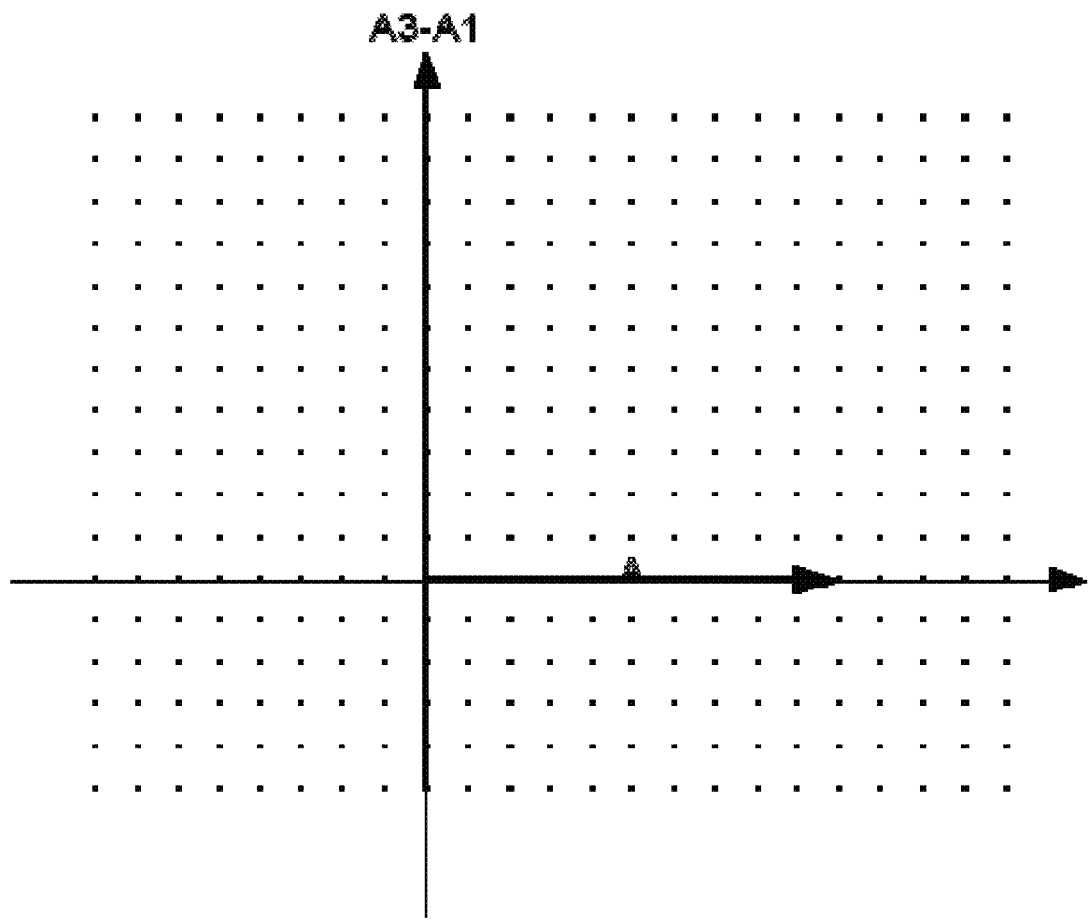
FIG. 2C is a phase diagram assuming that the measured phase P is exactly 0 degrees.

Assuming that a change in the digitized sample value of 1 must not change the depth measurement by more than the required resolution of for example 3 cm, a minimum digital value for this depth is derived by considering the following phase diagrams: Assuming that the measured phase P is exactly 0 degrees, then the phase diagram is shown in FIG. 2C.

If the measurement of A3-A1 is changed by 1 digital value, this should not change the phase P by more than 3 cm. This situation is sketched in FIG. 2D for a minimum phase change if one sample changes by the digital value 1.

In the case the system has a modulation frequency of 30 MHz and a non-ambiguity range of 5 m, the phase P needs to fulfill the following condition:

$$P < \frac{360° \cdot 3 \text{ cm}}{500 \text{ cm}} = 2.16°$$

Figure 2D:
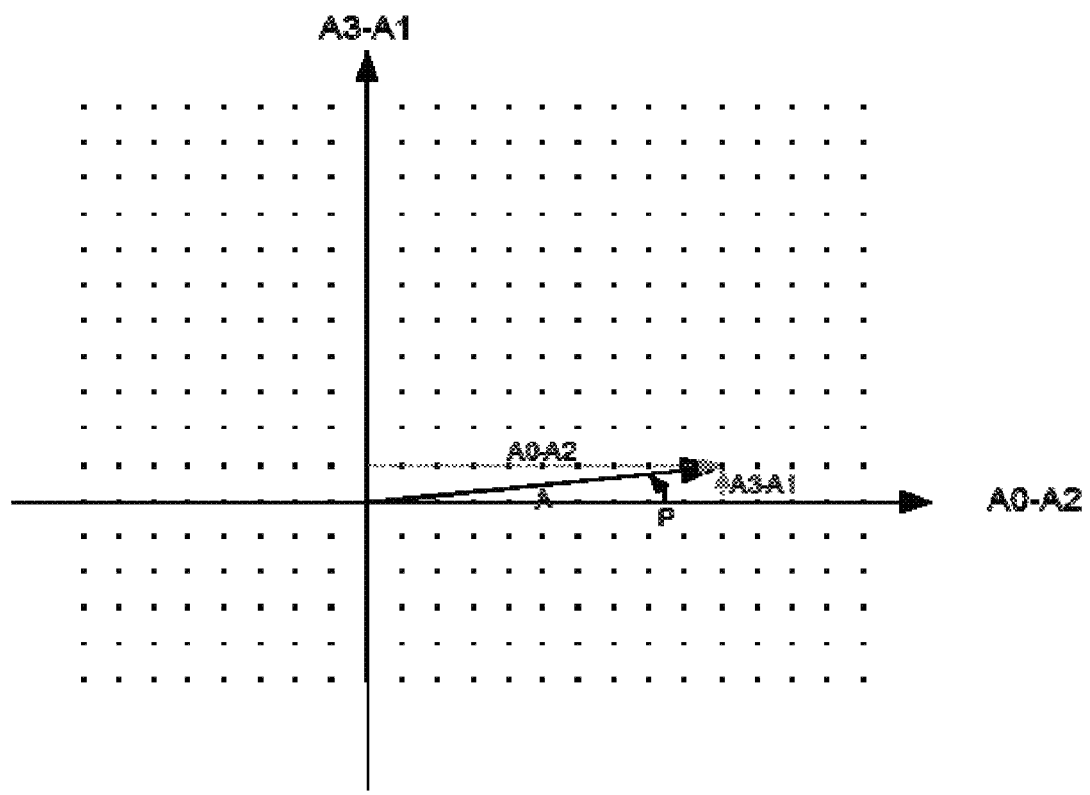
FIG. 2D is a phase diagram assuming that the measurement of A3-A1 is changed by 1 digital value.

Based on the sketch in FIG. 2D, to have a digital resolution of at least 2.16°, A0-A2 needs to be $$A0 - A2 = \text{ceil}\left(\frac{A3 - A1}{\tan(2.16°)}\right) = \text{ceil}\left(\frac{1}{\tan(2.16°)}\right) = 27$$

In conclusion, the minimum digital value for A0-A2 to have a digital conversion resolution of 3 cm or 2.16° is 27.

To guarantee high-speed and cost-effective implementations, generally a 12 bit AD converter is used. The utilization of a 12 bit AD converter results in the following dynamic range that is covered by the system under the premise of ensuring a depth resolution of better than 3 cm:

$$DR_{digital} = \frac{2^{12}}{27} = 151$$

The digital dynamic range of 151 is far below the scene's dynamic range requirement of 1,000. This is addressed with the following system that allows for subframe compression.

FIG. 3 illustrates a demodulation pixel 210 with its different functional blocks. The impinging light is converted in charge carriers in the photo-sensitive area 212 of the pixel 210. Typically a lateral electrical drift field is provided in the photo-sensitive area 212 to sweep the charge carriers to a demodulator/correlator 218, which transfers the photo-generated charges in an alternating fashion to the n different storage sites 220A, 220B to 220N, which accumulate the charges generated in each subframe. The transfer to the different storage sites 220A, 220B to 220N is typically performed synchronously with the modulation of the light source 510.

Before reading out the storage sites 220 with the n samples, many demodulation pixels include in-pixel processing 222 e.g. for common mode suppression. In its simplest form, the demodulation pixel 210 only includes a sensitive area 212, a correlator/demodulator 218, storage sites 220 and readout 224.

The sensing 212 and demodulation 218 can be done using dynamic lateral drift fields as described in U.S. Pat. No. 7,498,621 B2, which is incorporated herein in its entirety, or static lateral drift fields as described in U.S. Pat. Appl. No. 2008/0239466 A1, which is incorporated herein in its entirety. Various approaches have been published based on the static lateral drift field principle B. Büttgen, F. Lustenberger and P. Seitz, Demodulation Pixel Based on Static Drift Fields, IEEE Transactions on Electron Devices, 53(11):2741-2747, November 2006, Cédric Tubert et al., High Speed Dual Port Pinned-photodiode for Time-Of-Flight Imaging, International Image Sensor Workshop Bergen 2009, and D. Durini, A. Spickermann, R. Mandi, W. Brockherde, H. Vogt, A. Grabmaier, B. Hosticka, "Lateral drift-field photodiode for low noise, high-speed, large photoactive-area CMOS imaging applications", Nuclear Instruments and Methods in Physics Research A, 2010. Other methods do not have the photo-sensitive area 212 and the demodulation 218 physically separated such as the photo-detection assisted by switching majority currents, see M. Kuijk, D. van Niewenhove, "Detector for electromagnetic radiation assisted by majority current", September 2003, EP 1 513 202 A1, or the methods based on toggling large transfer gates, see U.S. Pat. No. 5,856,667, U.S. Pat. No. 6,825,455, and US 2002/0084430 A1. All of those sensing/demodulation methods can be implemented here.

Figure 4:
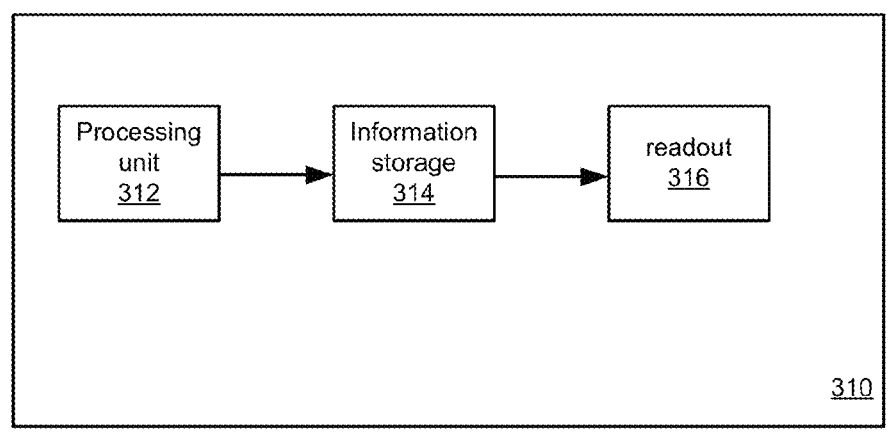
FIG. 4 is a block diagram showing the functions of a proxel.

FIG. 4 shows the functions of the storage elements or proxels 310. A subframe compression is integrated within a processing unit 312 providing compression of the digital signals from the associated pixel, an information storage unit 314 accumulates the subframes of generated information, and a data readout unit 316 enables the information readout. Instead of reading out the pixel matrix 110, the proxel array 150 is readout.

Figure 5:
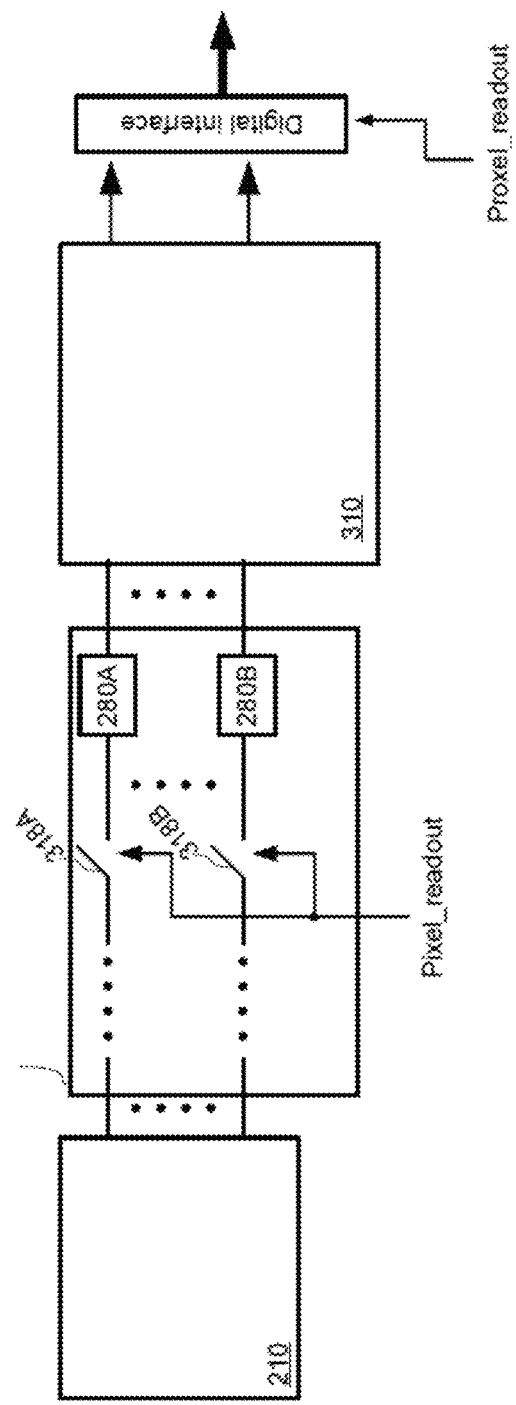
FIG. 5 shows a diagram showing the pixel-proxel connection including an analogue to digital converter.

FIG. 5 shows the pixel to proxel transfer or connection system 180 converting the information into the digital domain. There is one analog to digital converter 280A, 280B per output line. The Pixel_readout signal, controlled by the pixel readout decoder 182, provides the analog signals from the pixels to the converters 280A, 280B, which analog to digital convert the charges accumulated during each subframe into digital values that are accumulated in the subframe accumulation unit 314, which has storage elements for each of the storage sites 220A-220N.

Figure 6:
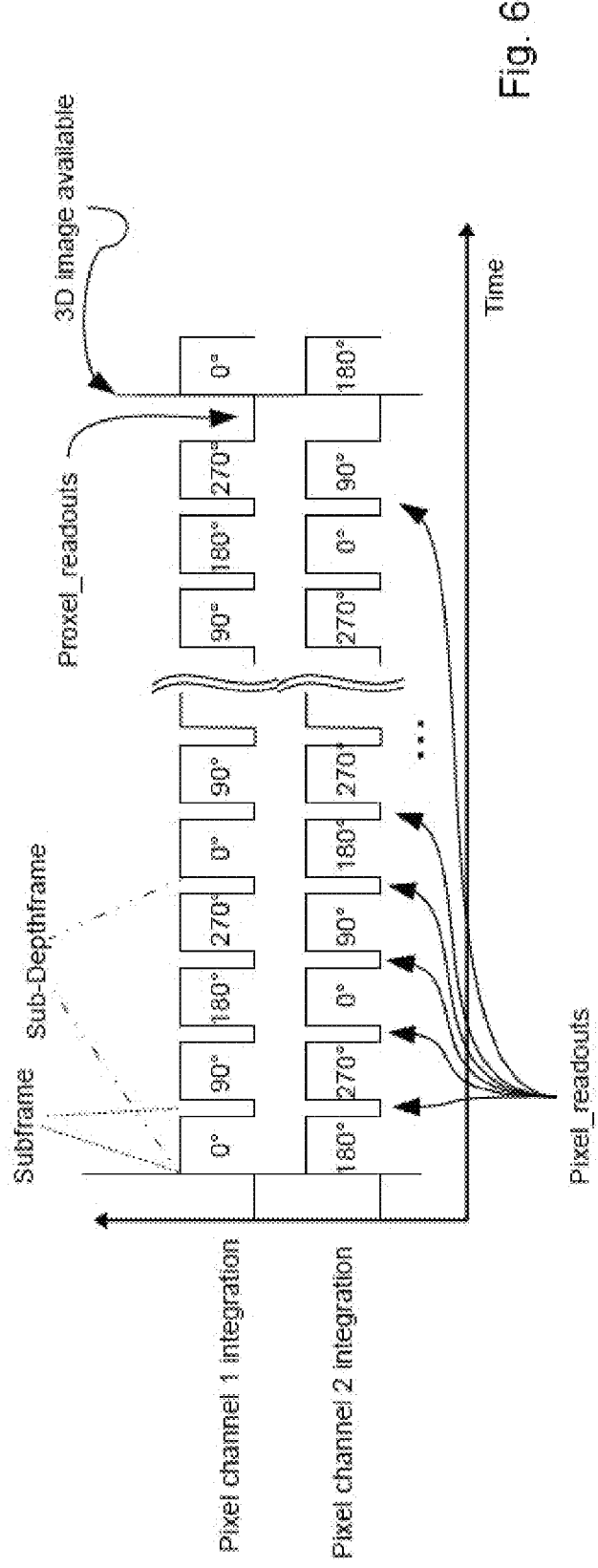
FIG. 6 shows a timing of a 3D image acquisition based on a state-of-the-art 2-tap demodulation with 2-tap pixel with separate pixel and proxel arrays.

FIG. 6 is a timing diagram illustrating the operation of the sensor 100 providing the same mismatch cancellation method on a 2-tap pixel architecture as described in U.S. Pat. No. 7,462,808. (In such an implementation, only two storage sites 220A and 220B in FIG. 3 are present.) The different integrations of the samples are repeatedly accomplished for each of pixel channel 1 (or storage site 220A) and pixel channel 2 (or storage site 220B). Each of the pixels is readout as a subframe for the phases in the sequence 0 degrees, 90 degrees, 180 degrees and 270 degrees for channel 1 and 180 degrees, 270 degrees, 0 degrees and 180 degrees for channel 2, in the illustrated example.

Each sub-frame is converted to a digital value by the analog to digital converters 280A, 280B for each channel upon each pixel readout/subframe and accumulated within the proxels. Four different sample acquisitions take place with four subframes leading virtually to one 3D sub-depth image every four integration cycles/four subframes. After reaching a certain number of subframe accumulations the full 3D image is constructed. The overall timing diagram based on subframe acquisitions allows for optimized short integration of the subframe samples so that timely critical object changes during the overall image acquisition get inherently better and filtered out. The proxels enable the intermediate storage on-chip. This allows faster readout and for this reason the different samples can be captured much closer to each other and therefore reduce motion artifacts further.

The present system divides the acquisition into several subframes. Each subframe is digitized and summed up in the proxels 310. The addition of the different subframes reduces already the requirements to the ADC 280A, 280B. However, targeting a dynamic range of 1,000, the memory would need to store values of up to 27×1,000=27000 per differential sample. In binary representation, this means that 15 bits are needed.

The invention adds compression in the processing unit 312 unit to the system so that the digital values generated by the analog to digital converters 280A, 280B are compressed during integration. Preferably, the low signal values are not or only little compressed whereas large signal values can be more compressed.

A possible implementation of an exponential compression is sketched below:

In the example, the digitized value is compressed in the mantis and the exponent of:

$$\text{compressed value} = \text{mantis}(2^{exponent})$$

The mantis component is expressed in 3 bits, going from 0 to 7. The exponent starts at 0 and goes up to 12. The compression as illustrated here covers a dynamic from 1 to 28672. Considering the aforementioned example of demanding for a minimum of 27 digits for the minimum signal, the requested dynamic range of 1000 for the specified distance and reflectivity ranges is reached.

Figure 7:
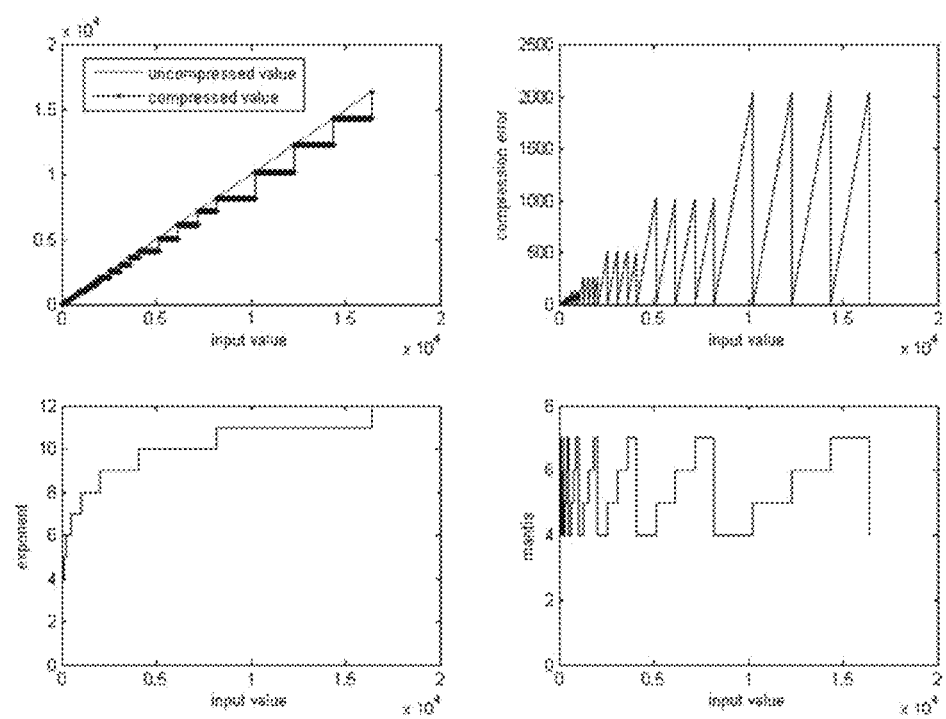
FIG. 7: top left: uncompressed and exponentially compressed digital values; top right: the error caused by the exponential compression; bottom left: the exponent of the compression; bottom right: the mantis part of the compression.

FIG. 7 illustrates compression up to a digitized value of 27,000. Instead of 15 bits required for the conversion, the exponential compression reduces the signal to 3 bits for the mantis and 4 more bits for the exponent.

Figure 8:
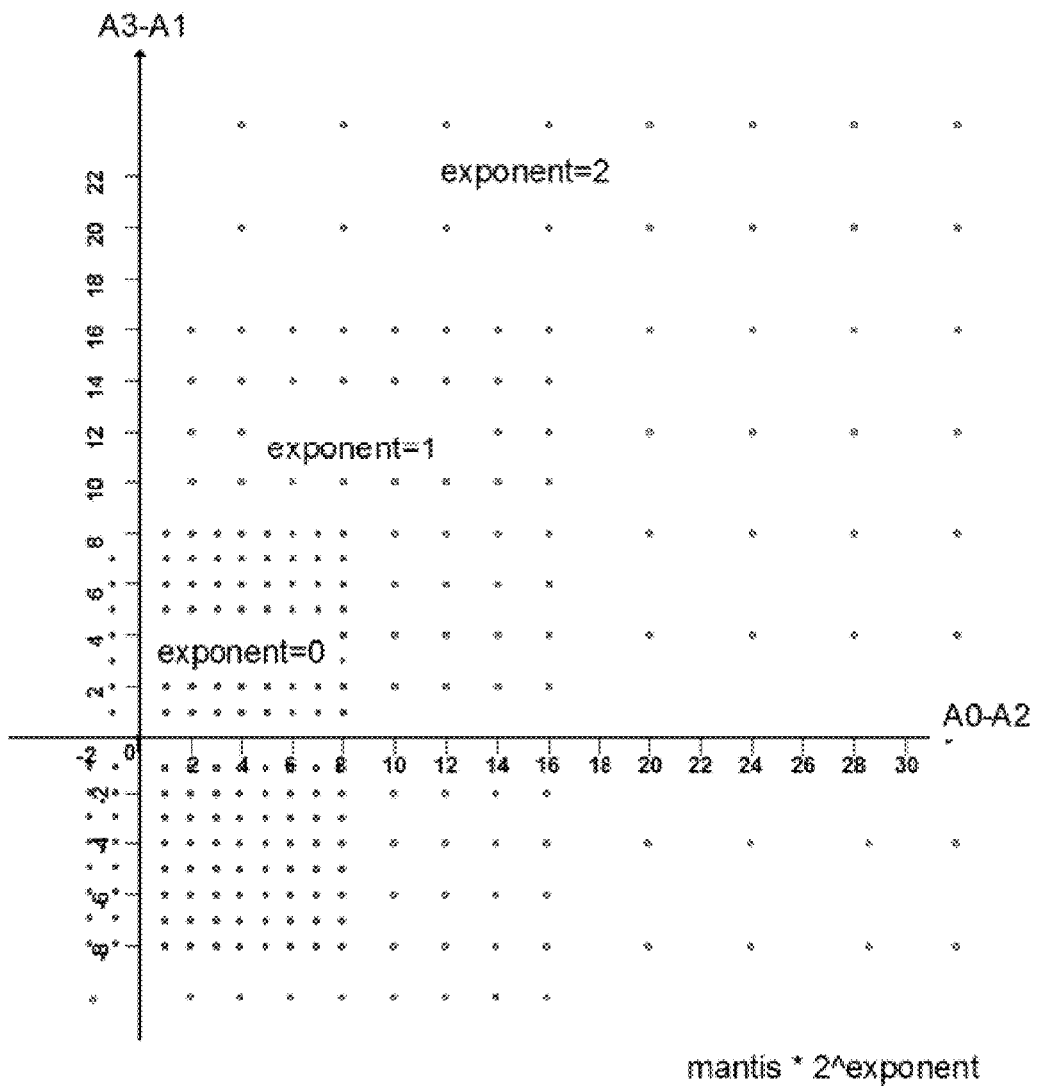
FIG. 8 is a phase diagram showing exponential compression.

A zoom-in to the low signal compression is illustrated in the phase diagram in FIG. 8.

The compression using only 3 bits in the mantis is primarily for illustration purposes. In practical implementations, the mantis contains more bits.

The compression using the exponential of 2 seems to be the straightest forward to implement, but from a theoretical aspect any data compression is possible.

Furthermore, in case a difference is calculated, the results can be either positive or negative. For this reason, the compression might also result in negative values, as indicated in the drawing of phase diagram of FIG. 8.

While this invention has been particularly shown and described with references to preferred embodiments thereof, it will be understood by those skilled in the art that various changes in form and details may be made therein without departing from the scope of the invention encompassed by the appended claims.

What is claimed is:

1. A demodulation sensor, comprising:
   a pixel array comprising pixels each of which produces at least two signals for subframes to synchronously demodulate modulated light from a light emitter;
   a storage array comprising storage elements, each of the storage elements is operable to receive digital subframes; and
   analog to digital converters between the pixel array and the storage array,
   wherein the analog to digital converters are operable to convert the at least two signals into the digital subframes, and
   wherein the storage elements are operable to compress the digital subframes and to accumulate the compressed digital subframes into full frames.

2. The demodulation sensor as claimed in claim 1, wherein the storage elements perform exponential compression.

3. The demodulation sensor as claimed in claim 1, further comprising a pixel readout controller for controlling readout of the signals from the pixel array.

4. The demodulation sensor as claimed in claim 1, wherein each subframe comprises signals accumulated for different phase angles.

5. A demodulation method, comprising:
   in a pixel array, producing at least two signals for each pixel for every subframe;
   converting the at least two signals into digital subframes;
   in a storage array comprising storage elements, receiving at each of the storage elements the digital subframes, compressing the digital subframes, and accumulating the compressed digital subframes into full frames,
   wherein converting the at least two signals into digital subframes is performed by analog to digital converters between the pixel array and the storage array.

6. The method as claimed in claim 5, wherein compressing the digital subframes comprises performing exponential compression of the digital subframes.

7. The method as claimed in claim 5, further comprising controlling pixel readout of the signals from the pixel array.

8. The method as claimed in claim 5, wherein each subframe comprises signals accumulated for different phase angles.

9. A time of flight camera, comprising:
   a light emitter for generating intensity modulated light; and
   a sensor including:
      a pixel array comprising pixels that each produce at least two signals for subframes to synchronously demodulate the intensity modulated light from the light emitter,
      a storage array comprising storage elements, each of the storage elements is operable to receive digital subframes; and
      analog to digital converters between the pixel array and the storage array wherein the analog to digital converters are operable to convert the at least two signals into the digital subframes, and
      wherein the storage elements are operable to compress the digital subframes and to accumulate the compressed digital subframes into full frames.

10. The time of flight camera as claimed in claim 9, wherein the storage elements perform exponential compression.

11. The time of flight camera as claimed in claim 9, further comprising a pixel readout controller for controlling the readout of the signals from the pixel array.

12. The time of flight camera as claimed in claim 9, wherein each subframe comprises signals accumulated for different phase angles of the intensity modulated light.

* * * * *